US012613699B2

(12) United States Patent
Oland

(10) Patent No.: US 12,613,699 B2
(45) Date of Patent: Apr. 28, 2026

(54) DMA CONTROLLER AND LSU TO TRANSPOSE DATA ARRAYS STORED IN MAIN MEMORY FOR STORAGE IN PROCESSOR REGISTERS

(71) Applicant: Sony Interactive Entertainment Inc., Tokyo (JP)

(72) Inventor: Jeppe Oland, San Francisco,, CA (US)

(73) Assignee: Sony Interactive Entertainment Inc., Tokyo (JP)

(*) Notice: Subject to any disclaimer, the term of this patent is extended or adjusted under 35 U.S.C. 154(b) by 0 days.

(21) Appl. No.: 18/956,439

(22) Filed: Nov. 22, 2024

(65) Prior Publication Data

US 2025/0208870 A1 Jun. 26, 2025

Related U.S. Application Data

(60) Provisional application No. 63/612,968, filed on Dec. 20, 2023.

(51) Int. Cl.
*G06F 9/30* (2018.01)

(52) U.S. Cl.
CPC ...... *G06F 9/30043* (2013.01); *G06F 9/30029* (2013.01); *G06F 9/30032* (2013.01)

(58) Field of Classification Search
CPC ............. G06F 9/30029; G06F 9/30032; G06F 9/30036; G06F 9/30043; G06F 12/1081; G06F 2213/28
See application file for complete search history.

(56) References Cited

U.S. PATENT DOCUMENTS

| | | | | |
|---|---|---|---|---|
| 5,502,747 | A | | 3/1996 | McGrath |
| 5,619,198 | A | | 4/1997 | Blackham et al. |
| 5,815,421 | A | | 9/1998 | Dulong et al. |
| 5,862,407 | A | * | 1/1999 | Sriti ........................ G06F 13/28 710/33 |
| 5,872,965 | A | | 2/1999 | Petrick |
| 6,006,245 | A | | 12/1999 | Thayer |
| 6,021,206 | A | | 2/2000 | McGrath |
| 6,259,795 | B1 | | 7/2001 | McGrath |
| 6,373,416 | B1 | | 4/2002 | McGrath |
| 6,389,390 | B1 | | 5/2002 | Reilly |

(Continued)

FOREIGN PATENT DOCUMENTS

| | | | |
|---|---|---|---|
| CN | 1291766 | A | 4/2001 |
| CN | 101050971 | A | 10/2007 |

(Continued)

OTHER PUBLICATIONS

[No Author Listed], "Digital signal processing with v850 and v850e devices," Renesas Electronics Corporation, May 2005, 56 pages.

(Continued)

*Primary Examiner* — Jacob Petranek
(74) *Attorney, Agent, or Firm* — Fish & Richardson P.C.

(57) ABSTRACT

One or more hardware elements operate on an array of data from a memory to generate a shuffled array of data. A subsequent of hardware operations on the shuffled array of data produces a transposed array of data in which rows and columns of the array of data are transposed. A load-store unit may then load the array of transposed data into a plurality of processor registers.

17 Claims, 7 Drawing Sheets

(56) References Cited

U.S. PATENT DOCUMENTS

| | | | | |
|---|---|---|---|---|
| 6,421,697 | B1 | 7/2002 | McGrath et al. | |
| 6,505,223 | B1 | 1/2003 | Haitsma et al. | |
| 6,625,629 | B1 | 9/2003 | Garcia | |
| 6,804,771 | B1 * | 10/2004 | Jung | G06F 9/30141 712/E9.023 |
| 9,431,987 | B2 | 8/2016 | Betbeder et al. | |
| 9,614,713 | B1 | 4/2017 | Dias et al. | |
| 11,669,464 | B1 * | 6/2023 | Bilski | G06F 12/0607 711/154 |
| 2004/0215683 | A1 | 10/2004 | Beaumont | |
| 2006/0038710 | A1 | 2/2006 | Staszewski et al. | |
| 2006/0051088 | A1 | 3/2006 | Lee et al. | |
| 2006/0114214 | A1 * | 6/2006 | Griffin | G09G 3/346 345/98 |
| 2010/0293214 | A1 | 11/2010 | Longley | |
| 2011/0107060 | A1 | 5/2011 | McAllister et al. | |
| 2011/0246787 | A1 | 10/2011 | Farrugia et al. | |
| 2011/0307459 | A1 | 12/2011 | Jacob et al. | |
| 2012/0113133 | A1 | 5/2012 | Shpigelblat | |
| 2013/0262880 | A1 | 10/2013 | Pong et al. | |
| 2014/0355786 | A1 | 12/2014 | Betbeder et al. | |
| 2016/0306566 | A1 | 10/2016 | Lu et al. | |
| 2020/0363978 | A1 | 11/2020 | Kajigaya | |
| 2021/0097375 | A1 | 4/2021 | Huynh et al. | |
| 2022/0130404 | A1 | 4/2022 | Fuchs et al. | |
| 2022/0207108 | A1 | 6/2022 | Dupont et al. | |
| 2022/0244919 | A1 * | 8/2022 | Bondarenko | G06F 7/76 |
| 2023/0185570 | A1 * | 6/2023 | Kerr | G06F 12/0888 712/225 |
| 2023/0259469 | A1 * | 8/2023 | Zheng | G06F 13/28 710/308 |
| 2025/0210050 | A1 | 6/2025 | Oland | |

FOREIGN PATENT DOCUMENTS

| | | | |
|---|---|---|---|
| CN | 100353664 | C | 12/2007 |
| CN | 101283520 | A | 10/2008 |
| CN | 101617235 | A | 12/2009 |
| CN | 102387270 | A | 3/2012 |
| CN | 102419396 | A | 4/2012 |
| CN | 103001605 | A | 3/2013 |
| EP | 1081684 | A2 | 3/2001 |
| WO | WO 1999/049574 | A1 | 9/1999 |
| WO | WO 2003/012405 | A2 | 2/2003 |

OTHER PUBLICATIONS

Armelloni et al., “Implementation of real-time partitioned convolution on a DSP board,” 2003 IEEE Workshop on Applications of Signal Processing to Audio and Acoustics, Oct. 19-22, 2003, pp. 71-74 (4 pages).

Battenberg et al., “Implementing real-time partitioned convolution algorithms on conventional operating systems,” Proc. of the 14th Int. Conference on Digital Audio Effects (DAFx-11), Sep. 19-23, 2011, pp. 313-320 (DAFX-1-8, 8 pages).

engineeringproductivitytools.com [online], “Practical Considerations.” Engineering Productivity Tools, available on or before Jul. 1, 2007, via Internet Archive: Wayback Machine URL<https://web.archive.org/web/20070701164121/http://www.engineeringproductivitytools.com/stuff/T0001/PT05.HTM>, retrieved on Apr. 26, 2013, URL<http://www.engineeringproductivitytools.com/stuff/T0001/PT05.HTM>, 6 pages.

Kabal et al., “Rounding and Scaling in Fixed-Point FFT Implementations,” Rapport Technique De l’INRS—Telecommunications, Jun. 12, 1985, 48 pages.

Torger et al., a, A, “Real-time partitioned convolution for Ambiophonics surround sound,” 2001 IEEE Workshop on the Applications of Signal Processing to Audio and Acoustics, 2001, pp. 195-198 (W2001-1-4, 4 pages).

wikipedia.org [online], “Complex Number,” Oct. 17, 2023, retrieved on Oct. 26, 2023, retrieved from URL<https://en.wikipedia.org/wiki/Complex_number>, 13 pages.

Chen, “Digital signal processing on MMX technology,” Programmable Digital Signal Processors, 2001, retrieved on Dec. 3, 2025, retrieved from URL<https:/ /citeseerx.ist. psu.edu/document?repid=rep 1 &type=pdf &doi=074ee0579ec7ae05cd2c55f3d7cf7848e4613f58>, 34 pages.

Courtaud et al., “Improving prediction accuracy of memory interferences for multicore platforms,” RTSS 2019—40th IEEE Real-Time Systems Symposium, Dec. 2019, retrieved on Dec. 3, 2025, retrieved from URL<https://inria.hal.science/hal-02401625/file/RTSS_cedric.pdf>, 15 pages.

Dun et al., “Towards efficient canonical polyadic decomposition on sunway many-core processor,” Information Sciences, 549 (2021):221-248.

International Search Report and Written Opinion in International Application No. PCT/US2024/057395, mailed on Feb. 13, 2025, 14 pages.

* cited by examiner r0 = A0, A1, A2, A3, A4, A5, A6, A7 r1 = B0, B1, B2, B3, B4, B5, B6, B7 r2 = C0, C1, C2, C3, C4, C5, C6, C7 r3 = D0, D1, D2, D3, D4, D5, D6, D7 r4 = E0, E1, E2, E3, E4, E5, E6, E7 r5 = F0, F1, F2, F3, F4, F5, F6, F7 r6 = G0, G1, G2, G3, G4, G5, G6, G7 r7 = H0, H1, H2, H3, H4, H5, H6, H7

Swap XOR 1 r0 = A0, B0, A2, B2, A4, B4, A6, B6 r1 = A1, B1, A3, B3, A5, B5, A7, B7 r2 = C0, D0, C2, D2, C4, D4, C6, D6 r3 = C1, D1, C3, D3, C5, D5, C7, D7 r4 = E0, F0, E2, F2, E4, F4, E6, F6 r5 = E1, F1, E3, F3, E5, F5, E7, F7 r6 = G0, H0, G2, H2, G4, H4, G6, H6 r7 = G1, H1, G3, H3, G5, H5, G7, H7 r0 = A0, B0, A2, B2, A4, B4, A6, B6 r1 = A1, B1, A3, B3, A5, B5, A7, B7 r2 = C0, D0, C2, D2, C4, D4, C6, D6 r3 = C1, D1, C3, D3, C5, D5, C7, D7 r4 = E0, F0, E2, F2, E4, F4, E6, F6 r5 = E1, F1, E3, F3, E5, F5, E7, F7 r6 = G0, H0, G2, H2, G4, H4, G6, H6 r7 = G1, H1, G3, H3, G5, H5, G7, H7

Swap XOR 2 r0 = A0, B0, C0, D0, A4, B4, C4, D4 r1 = A1, B1, C1, D1, A5, B5, C5, D5 r2 = A2, B2, C2, D2, A6, B6, C6, D6 r3 = A3, B3, C3, D3, A7, B7, C7, D7 r4 = E0, F0, G0, H0, E4, F4, G4, H4 r5 = E1, F1, G1, H1, E5, F5, G5, H5 r6 = E2, F2, G2, H2, E6, F6, G6, H6 r7 = E3, F3, G3, H3, E7, G7, G7, H7 r0 = A0, B0, C0, D0, A4, B4, C4, D4 r1 = A1, B1, C1, D1, A5, B5, C5, D5 r2 = A2, B2, C2, D2, A6, B6, C6, D6 r3 = A3, B3, C3, D3, A7, B7, C7, D7 r4 = E0, F0, G0, H0, E4, F4, G4, H4 r5 = E1, F1, G1, H1, E5, F5, G5, H5 r6 = E2, F2, G2, H2, E6, F6, G6, H6 r7 = E3, F3, G3, H3, E7, G7, G7, H7

Swap XOR 3 r0 = A0, B0, C0, D0, E0, F0, G0, H0 r1 = A1, B1, C1, D1, E1, F1, G1, H1 r2 = A2, B2, C2, D2, E2, F2, G2, H2 r3 = A3, B3, C3, D3, E3, F3, G3, H3 r4 = A4, B4, C4, D4, E4, F4, G4, H4 r5 = A5, B5, C5, D5, E5, F5, G5, H5 r6 = A6, B6, C6, D6, E6, F6, G6, H6 r7 = A7, B7, C7, D7, E7, G7, G7, H7

DMA CONTROLLER AND LSU TO TRANSPOSE DATA ARRAYS STORED IN MAIN MEMORY FOR STORAGE IN PROCESSOR REGISTERS

PRIORITY

This application claims the benefit of priority to provisional application Ser. No. 63/612,968, filed 20 Dec. 2023, the entire disclosures of which are incorporated herein by reference.

FIELD OF THE DISCLOSURE

The present disclosure relates to computer memory access and more specifically to speeding up access to computer memory by transposing data in hardware.

BACKGROUND

In computer systems, memory or CPU registers are often represented as banks of memory, e.g., 8 lanes that can be accessed at the same time. For some types of processing, it may be necessary to transpose the data stored in lanes and access them as vertical columns. For example, in filtering of data, every single sample depends on the previous sample. It makes sense to transpose so that all samples for one channel are in one column. Transpose, process, reverse transpose.

If you have, say, a 4×4 square array of data and you can do loads on horizontal rows without penalty but there is a penalty for accessing columns since every bank is coming from the same place. In this example, each row may be loaded in a single memory operation but loading each column would require four memory operations.

It is within this context that aspects of the present disclosure arise.

DETAILED DESCRIPTION

Although the following detailed description contains many specific details for the purposes of illustration, anyone of ordinary skill in the art will appreciate that many variations and alterations to the following details are within the scope of the invention. Accordingly, examples of embodiments of the invention described below are set forth without any loss of generality to, and without imposing limitations upon, the claims.

According to aspects of the present disclosure a computer system architecture may be configured to read the data from main memory into a separate memory for an accelerator block. In some implementations the accelerator block may be implemented by enhancing the capabilities of certain hardware used to transfer data. For example, a DMA controller may send buffered into a local memory. Typically, this transfer would just be a 1:1 lane-to-lane linear transfer. It is generally not feasible to have the DMA controller transpose the memory fully due to the buffering requirements. For example, in the case of an 8×8 array of data it would need to buffer 8×8 words of information. However, if the DMA controller had some processing capability, it could do some simple shuffling of the data as it is transferred from main memory to local memory. Subsequent data transfer operations on the shuffled data could complete the transposition.

Figure 1:
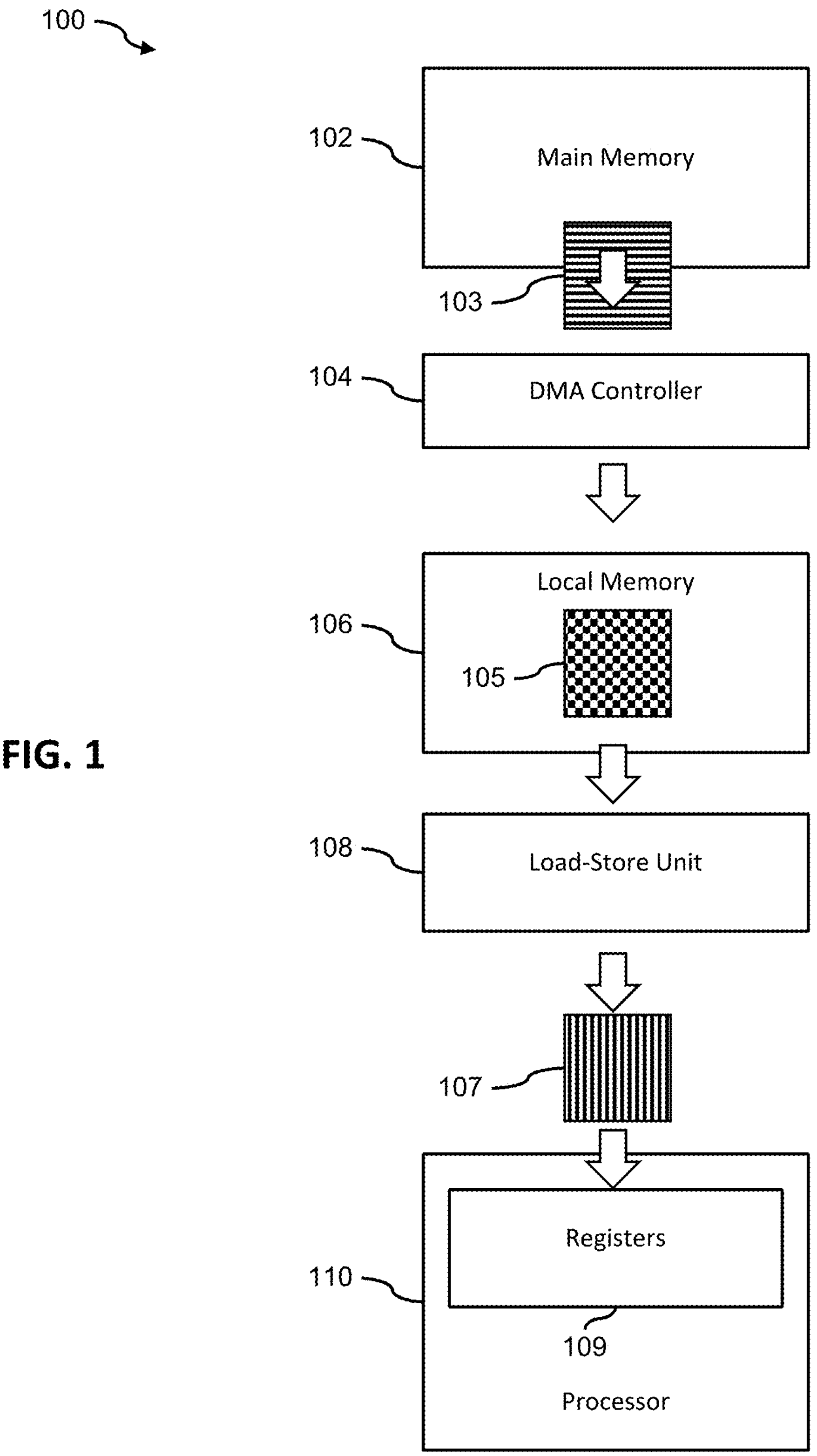
FIG. 1 is a schematic diagram depicting operation of a computer system having enhanced memory access according to aspects of the present disclosure.

According to aspects of the present disclosure a computer system may include specially configured memory access and load-store hardware that can perform an automated XOR pattern to load transposed data from memory into processor registers. FIG. 1 illustrates the concept behind such a computer system. In FIG. 1, a computer system 100 includes a main memory 102, a direct access memory (DMA) controller 104, a local memory 106, a load-store unit (LSU) 108 and processor 110 having a plurality of registers 109. The DMA controller 104 configured to perform one or more operations on an array of data 103 from the main memory 102 to generate a shuffled array of data 105 from the array of data and store the shuffled array in the local memory 106. The LSU 108 is configured to perform one or more operations on the shuffled array of data 105 to produce a transposed array of data 107 in which rows and columns of the array of data 103 are transposed. The load-store unit is configured to load the transposed array of data 107 into the plurality of registers 109 of the processor 110.

Direct memory access (DMA) is a feature of computer systems that allows certain hardware subsystems to access main system memory independently of a central processing unit (CPU). The DMA controller 104 handles memory transfer operations initiated by the CPU allowing the CPU to perform other operations while the transfer is in progress. The DMA controller sends the CPU an interrupt when the memory transfer operation is completed. DMA is a useful feature, e.g., when the CPU cannot keep up with the rate of data transfer, or when the CPU needs to perform work while waiting for a relatively slow I/O data transfer. Many hardware systems use DMA, including disk drive controllers, graphics cards, network cards and sound cards. DMA is also used for intra-chip data transfer in some multi-core processors. Computers that have DMA channels can transfer data to and from devices with much less CPU overhead than computers without DMA channels. Similarly, a processing circuitry inside a multi-core processor can transfer data to and from its local memory without occupying its processor time, allowing computation and data transfer to proceed in parallel.

The DMA controller 104 may be configured to generate memory addresses and initiate memory read or write cycles. It contains several hardware registers that can be written and read by the CPU. These may include a memory address register, a byte count register, and one or more control registers. By way of example and not by way of limitation, the control registers may specify some combination of the source, the destination, the direction of the transfer (reading from the I/O device or writing to the I/O device), the size of the transfer unit, and/or the number of bytes to transfer in one burst.

To carry out an input, output or memory-to-memory operation, a host processor, e.g., processor 110, may initialize the DMA controller 104 with a count of the number of bytes or words of data to transfer, and the memory address to use. The host processor then commands the peripheral device to initiate a data transfer. The DMA controller then provides addresses and read/write control lines to the system memory. Each time a byte of data is ready to be transferred between the peripheral device and memory, the DMA controller increments its internal address register until the full block of data is transferred.

Configuring hardware, such as the DMA controller 104 and/or LSU 108, to perform the XOR operations can significantly speed up memory access by reducing the number of instruction cycles required to perform the above-described XOR operations. By way of example, if the DMA controller-side XOR is performed in software it takes more cycles, e.g., 32 cycles for 32-bit vector. With the XOR operation done by the DMA controller 104 in hardware, by contrast, this can be done in one instruction cycle. The XOR pattern stores data diagonally, which makes the transpose operation relatively easy.

In computing, vectored I/O, also known as scatter/gather I/O, is a method of input and output by which a single procedure call sequentially reads data from multiple buffers and writes it to a single data stream (gather), or reads data from a data stream and writes it to multiple buffers (scatter), as defined in a vector of buffers. Scatter/gather refers to the process of gathering data from, or scattering data into, the given set of buffers. Vectored I/O can operate synchronously or asynchronously. The main reasons for using vectored I/O are efficiency and convenience.

The load-store unit (LSU) 108 is a specialized execution unit responsible for executing all load and store instructions, generating virtual addresses of load and store operations, and loading data from the memory 102 or storing it back to memory from registers 109. The LSU 108 usually includes a queue that acts as a waiting area for memory instructions, and the unit itself operates independently of other processor units. Load-store units may also be used in vector processing, and in such cases the term "load-store vector" may be used. Some load-store units are also capable of executing simple fixed-point and/or integer operations. As such, it is possible for the LSU to carry out operations on the shuffled data array 105 that complete the transpose of the input data array 103.

On many vector architectures, there is support for "gather" operations from memory. Essentially, each "lane" in a vector can load from a different location in memory. Normally, a load from memory into a vector register would simply take the data linearly starting from a single memory address. But with "gather" operations, each value in the vector will come from a unique memory address. Gather instructions are generally expensive. Memory/cache interfaces are frequently multi-banked, so that each bank can be accessed individually. For example, a normal "linear" vector load (for a vector width of 8) would read 8 consecutive memory locations. If the memory is structured as (at least) 8 banks, then all 8 values can be read in a single cycle. But with gather instructions, additional cycles may be required if several access operations need the same bank. Transposing an 8×8 array of data involves loading the values from the same column in the array, so the values all come from the same bank. This means it would need 8 cycles to satisfy the load request.

Figure 2:
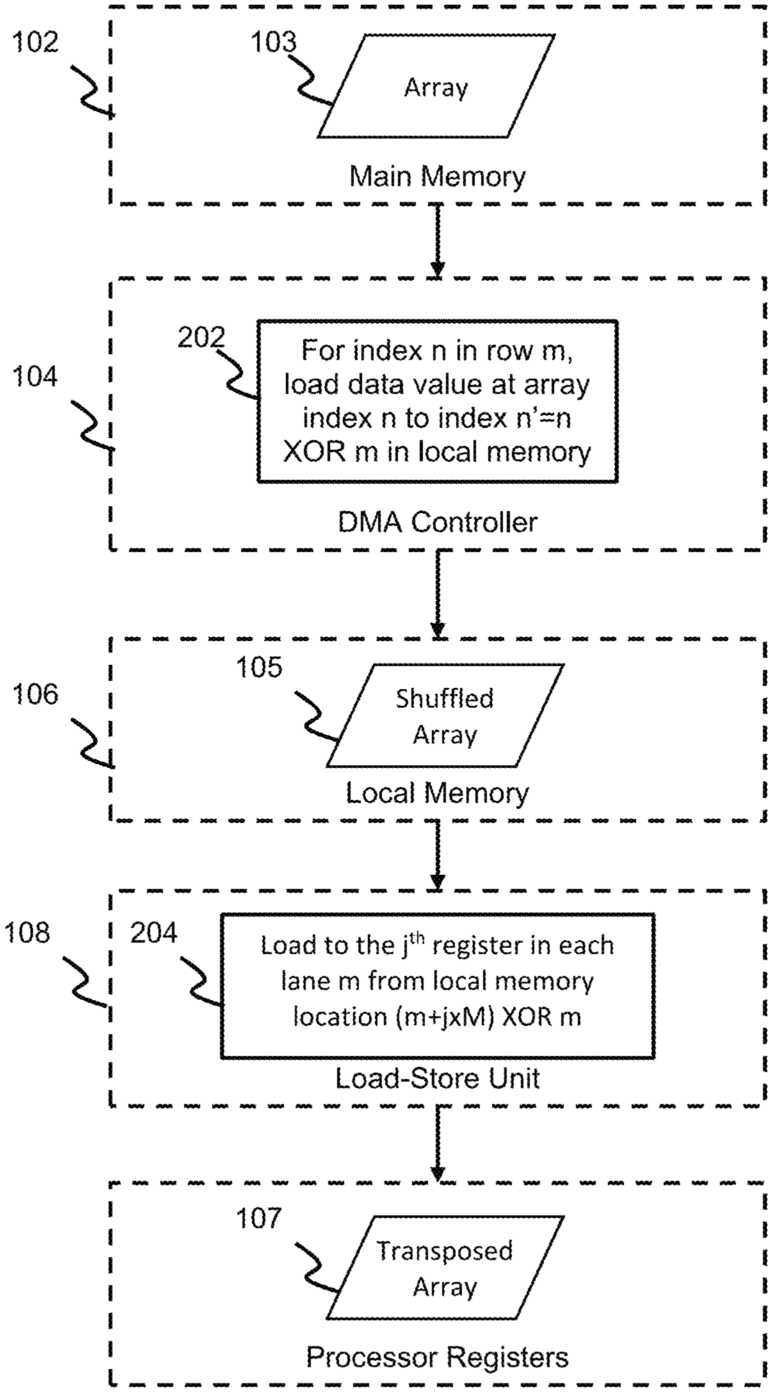
FIG. 2 is a flow diagram illustrating an example of enhanced memory access in a computer system using XOR operations according to an aspect of the present disclosure.

The shuffling of the data and subsequent operations to complete the transpose of the original array 103 may be understood by referring to FIG. 2 and Table I, Table II, and Table III below. In general, there are M lanes indexed by m ranging from 0 to M−1. Each lane has M registers for a total of N=M×M registers indexed by n ranging from 0 to N−1. For an 8×8 array of registers, the index values would be as shown in Table I below.

TABLE I

| | | | | | | | |
|---|---|---|---|---|---|---|---|
| 0 | 1 | 2 | 3 | 4 | 5 | 6 | 7 |
| 8 | 9 | 10 | 11 | 12 | 13 | 14 | 15 |
| 16 | 17 | 18 | 19 | 20 | 21 | 22 | 23 |
| 24 | 25 | 36 | 27 | 28 | 29 | 30 | 31 |
| 32 | 33 | 34 | 35 | 36 | 37 | 38 | 39 |
| 40 | 41 | 42 | 43 | 44 | 45 | 46 | 47 |
| 48 | 49 | 50 | 51 | 52 | 53 | 54 | 55 |
| 56 | 57 | 58 | 59 | 60 | 61 | 62 | 63 |

For each of the rows of data in the registers, the DMA controller 104 shuffles the "lanes" of data in the input array 103 by an incrementing XOR of the binary index value. Specifically, the data at array index value n for lane m in the input array would be stored in local memory 104 at index values given by n XOR m, as indicated at 202 in FIG. 2. The shuffling of lanes is shown in Table II below. To facilitate understanding, in Table II each register value in a given lane is represented by a capital letter starting at A indicating the lane and an integer starting at 0 indicating the location of the register within the lane. By way of example, for an 8×8 array of registers, the value in the first register in the first lane (corresponding to index value 0) is indicated by A0 and the value in the last register in the last lane (corresponding to index value 63) is indicated by H7.

TABLE II

| | | | | | | | | | | | | | | | | |
|---|---|---|---|---|---|---|---|---|---|---|---|---|---|---|---|---|
| A0 | A1 | A2 | A3 | A4 | A5 | A6 | A7 | XOR 0-> | A0 | A1 | A2 | A3 | A4 | A5 | A6 | A7 |
| B0 | B1 | B2 | B3 | B4 | B5 | B6 | B7 | XOR 1-> | B1 | B0 | B3 | B2 | B5 | B4 | B7 | B6 |
| C0 | C1 | C2 | C3 | C4 | C5 | C6 | C7 | XOR 2-> | C2 | C3 | C0 | C1 | C6 | C7 | C4 | C5 |
| D0 | D1 | D2 | D3 | D4 | D6 | D6 | D7 | XOR 3-> | D3 | D2 | D1 | D0 | D7 | D6 | D5 | D4 |
| E0 | E1 | E2 | E3 | E4 | E5 | E6 | E7 | XOR 4-> | E4 | E5 | E6 | E7 | E0 | E1 | E2 | E3 |
| F0 | F1 | F2 | F3 | F4 | F5 | F6 | F7 | XOR 5-> | F5 | F4 | F7 | F6 | F1 | F0 | F3 | F2 |
| G0 | G1 | G2 | G3 | G4 | G5 | G6 | G7 | XOR 6-> | G6 | G7 | G5 | G4 | G2 | G3 | G0 | G1 |
| H0 | H1 | H2 | H3 | H4 | H5 | H6 | H7 | XOR 7-> | H7 | H6 | H5 | H4 | H3 | H2 | H1 | H0 |

The shuffled array on the right side in Table II represents the shuffled 8×8 array 105 that ends up in the local memory 106. Although, at first glance, the shuffled array in local memory just looks jumbled, it actually allows the load-store unit 108 to load the data both linearly, and transposed, without any additional memory cycles. As a result of the incrementing XOR operations, the values in the first column of the input array 103 end up on the diagonal of the shuffled array 105. Also, the first row or "lane" of the shuffled array 105 is the same as the first lane of the input array 103 and the last row of the shuffled array is same as the first row of the input array, but in reverse order.

To load the shuffled array linearly, the same XOR pattern applied to the input array 103 needs to be applied for each load of the shuffled array 105. In general, the LSU 108 would load to the $j^{th}$ register in each lane m from local memory location (m+j×M) XOR m, where j ranges from 0 to M−1. Specifically, in the 8×8 array example, the load-store unit would load each "lane" in the vector from local memory indices 0, 1, 2, 3, 4, 5, 6, 7 (plus multiples of 8 to read from each row) along with the same XOR pattern. This is the same as above, but read from right to left. To load the first column transposed, the load-store unit would load from the "diagonal" along with the same XOR pattern. Specifically, according to the aforementioned XOR pattern, the first lane (m=0) would load from local memory indices (0+0) XOR 0, (1+8) XOR 0, (2+16) XOR 0, (3+24) XOR 0, (4+32) XOR 0, (5+40) XOR 0, (6+48) XOR 0, and (7+56) XOR 0 or the diagonal indices 0, 9, 18, 27, 36, 45, 54, and 63, corresponding to values A0, B0, C0, D0, E0, F0, G0, and H0 in the shuffled data stored in local memory.

Applying the XOR 1 to the local memory indexes, the second lane (m=1) would load from local memory indices 0 XOR 1=1, 9 XOR 1=8), 18 XOR 1=19), 27 XOR 1=26, 36 XOR 1=37, 45 XOR 1=44, 54 XOR 1=55, and 63 XOR 1=62, corresponding to values A1, B1, C1, D1, E1, F1, G1, H1.

Similarly applying the same XOR pattern, the third lane (m=2) would load from indices 0 XOR 2=2, 9 XOR 2=11, 18 XOR 2=16, 27 XOR 2=25, 36 XOR 2=38, 45 XOR 2=47, 54 XOR 2=52, and 63 XOR 2=61, corresponding to values A2, B2, C2, D2, E2, F2, G2, H2.

Applying the same XOR pattern, the fourth lane (m=3) would load from memory locations indexed by 0 XOR 3=3, 9 XOR 3=10, (18 XOR 3=17), (27 XOR 3=24), (36 XOR 3=39), (45 XOR 3=46), (54 XOR 3=53), and (63 XOR 3=60), corresponding to values A3, B3, C3, D3, E3, F3, G3, H3.

Continuing to apply the XOR pattern to the remaining lanes results in the transpose of the array of Table I being loaded by the load-store into processor registers according to the arrangement shown in Table III below.

TABLE III

| |
|---|
| XOR 0 -> A0, B0, C0, D0, E0, F0, G0, H0 |
| XOR 1 -> A1, B1, C1, D1, E1, F1, G1, H1 |
| XOR 2 -> A2, B2, C2, D2, E2, F2, G2, H2 |
| XOR 3 -> A3, B3, C3, D3, E3, F3, G3, H3 |
| XOR 4 -> A4, B4, C4, D4, E4, F4, G4, H4 |
| XOR 5 -> A5, B5, C5, D5, E5, F5, G5, H5 |
| XOR 6 -> A6, B6, C6, D6, E6, F6, G6, H6 |
| XOR 7 -> A7, B7, C7, D7, E7, F7, G7, H7 |

According to aspects of the present disclosure, the DMA controller 104 and/or LSU 108 may be configured to accelerator generation of the XOR patterns in the instructions. Although it is possible to do, e.g., 8 XOR operations in order to calculate the 8 different addresses for each row, doing so is time consuming. If instead the hardware were configured to, e.g., "XOR all addresses by X", then the 8 XOR operations could be done in a single operation. This could for example be encoded in the instruction itself. If one doesn't want to "waste" instruction bits, the XOR instruction could also be encoded in register values.

As an example, the Intel AVX2 implementation uses a "base address" register, along with the address vector that simply has an offset from the base for each "lane" in the vector. Typically, vector access to memory has to be aligned to the unit size (so a vector of 8 words has to be 32-byte aligned). This means the lower 5 bits of that address would all be 0, and could then be used to define the XOR value.

According to aspects of the present disclosure, the DMA controller 104 and/or LSU 108 may be configured to transpose data already in registers. For example, it is possible for the LSU to store the data in the processor registers 109 to local memory 106 using the above mechanism, and then load back again. But this uses local memory, which may be limited.

Instead, we can make a similar form of the above sequence using a SWAP instruction. Many architectures have an instruction to swap 2 registers. This allows us to efficiently transpose the data in the registers, and to do it in-place.

Assume our registers are called r0-r7 for the above 8×8 array example. Each register contains 8 entries. The first operation is to swap XOR 1 (swap even/odd pairs 4 instructions). The pairs being swapped are indicated in bold typeface in Table IV below. The pairs being swapped are shown by the dotted ovals in FIG. 3A.

TABLE IV

| |
|---|
| r0 = A0, **A1**, A2, **A3**, A4, **A5**, A6, **A7** |
| r1 = **B0**, B1, **B2**, B3, **B4**, B5, **B6**, B7 |
| r2 = C0, **C1**, C2, **C3**, C4, **C5**, C6, **C7** |
| r3 = **D0**, D1, **D2**, D3, **D4**, D5, **D6**, D7 |
| r4 = E0, **E1**, E2, **E3**, E4, **E5**, E6, **E7** |
| r5 = **F0**, F1, **F2**, F3, **F4**, F5, **F6**, F7 |
| r6 = G0, **G1**, G2, **G3**, G4, **G5**, G6, **G7** |
| r7 = **H0**, H1, **H2**, H3, **H4**, H5, **H6**, H7 |

The resulting register entries are shown below in Table V

TABLE V

| |
|---|
| r0 = A0, B0, A2, B2, A4, B4, A6, B6 |
| r1 = A1, B1, A3, B3, A5, B5, A7, B7 |
| r2 = C0, D0, C2, D2, C4, D4, C6, D6 |
| r3 = C1, D1, C3, D3, C5, D5, C7, D7 |
| r4 = E0, F0, E2, F2, E4, F4, E6, F6 |
| r5 = E1, F1, E3, F3, E5, F5, E7, F7 |
| r6 = G0, H0, G2, H2, G4, H4, G6, H6 |
| r7 = G1, H1, G3, H3, G5, H5, G7, H7 |

Figure 3A:
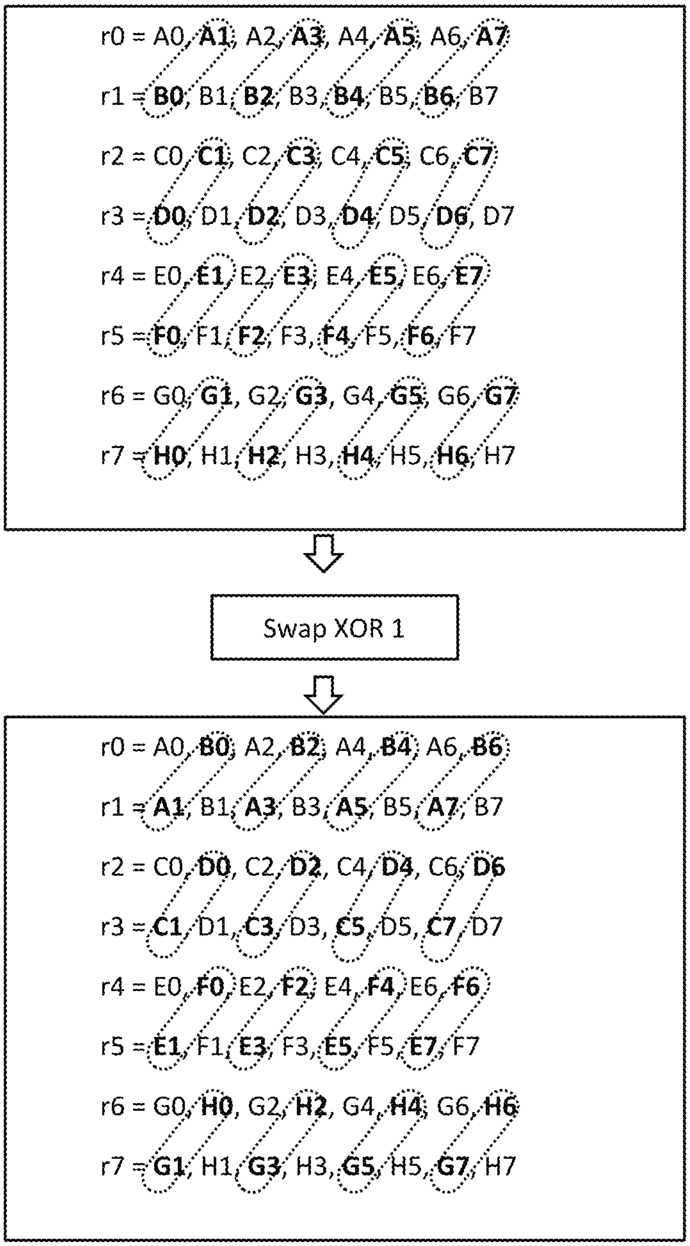
FIGS. 3A-3C are diagrams illustrating an example of enhanced memory access in a computer system using swap operations according to an aspect of the present disclosure.
Figure 3B:
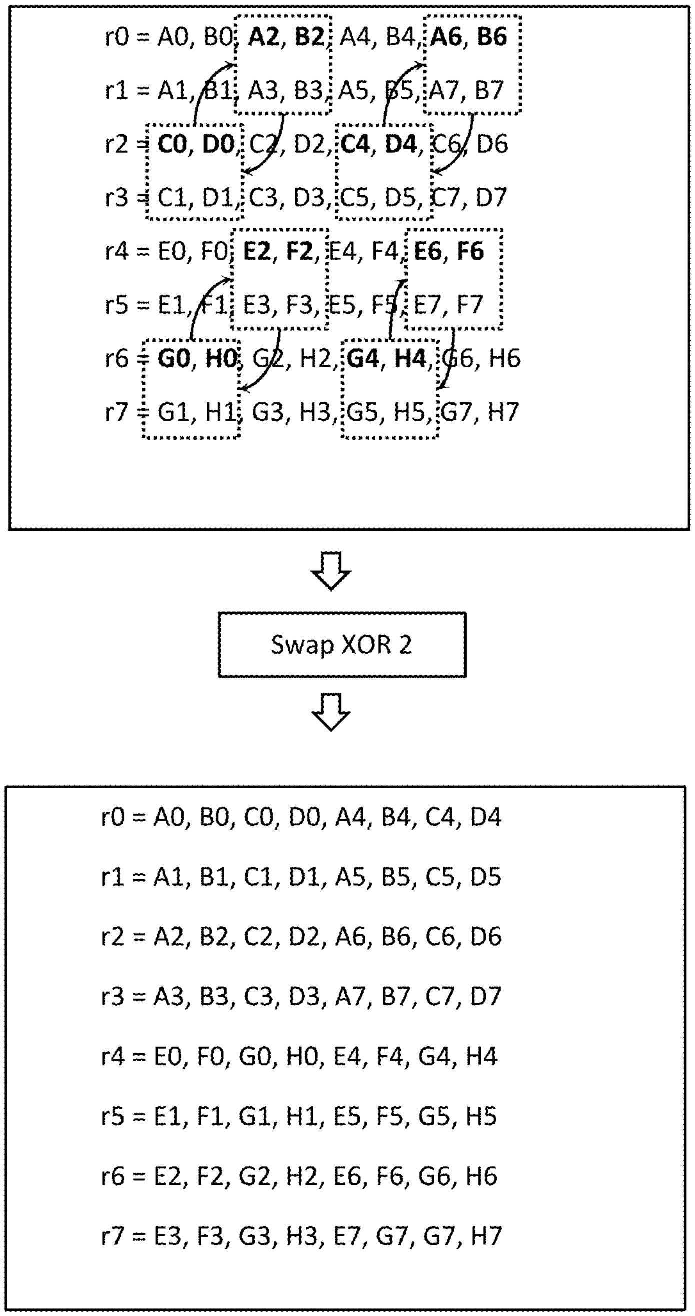

In a subsequent operation referred to as a "swap xor 2" double even/odd pairs of entries are swapped, e.g., by executing 4 instructions, as depicted in FIG. 3B. The register order has been rearranged in Table III below in order to show which double pairs are being swapped). Double pairs with the same typeface and border style in Table VI below are swapped.

TABLE VI

| |
|---|
| r0 = A0, B0, **A2**, **B2**, A4, B4, **A6**, **B6** |
| r2 = **C0**, **D0**, C2, D2, **C4**, **D4**, C6, D6 |
| r1 = A1, B1, A3, B3, A5, B5, A7, B7 |
| r3 = C1, D1, C3, D3, C5, D5, C7, D7 |
| r4 = E0, F0, E2, F2, E4, F4, E6, F6 |
| r6 = G0, H0, G2, H2, G4, H4, G6, H6 |
| r5 = E1, F1, **E3**, **F3**, E5, F5, **E7**, **F7** |
| r7 = **G1**, **H1**, G3, H3, **G5**, **H5**, G7, H7 |

Figure 3C:
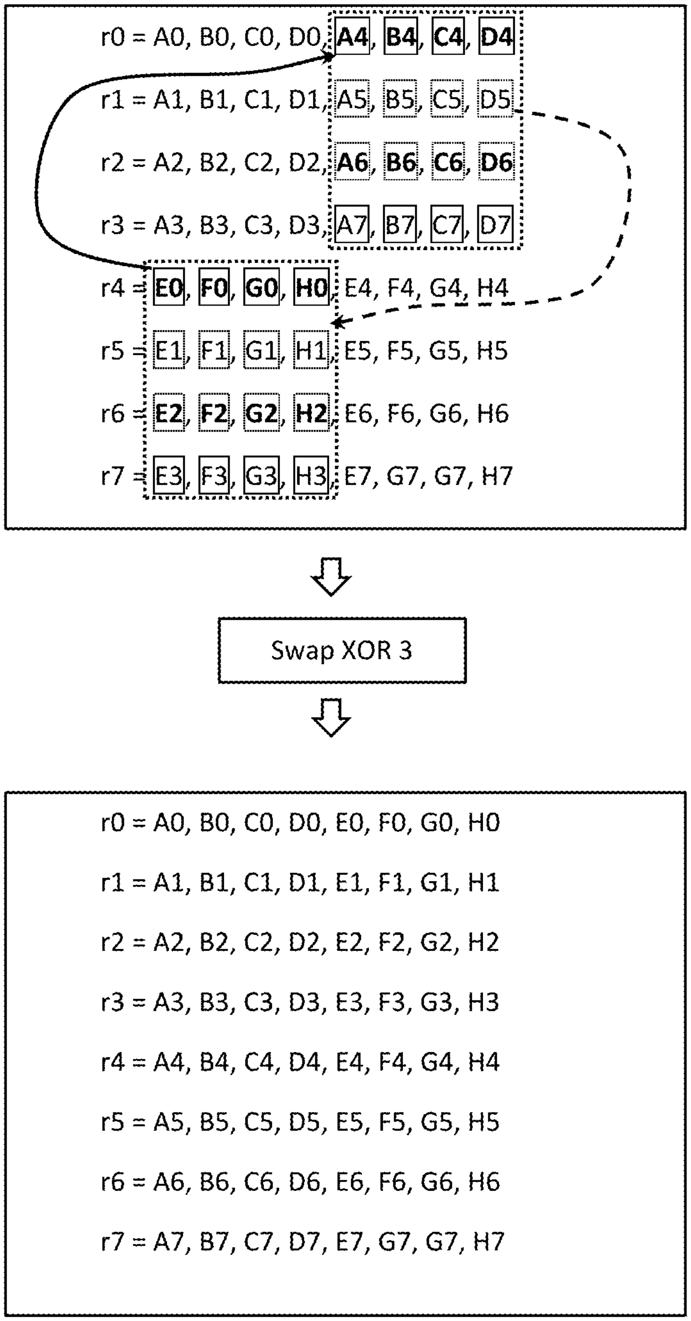

In a third operation depicted in FIG. 3C, referred to herein as swap xor 3, quadruple even/odd pairs are swapped (4 instructions). The order of the registers has been rearranged below to show which 2 quadruple pairs are being swapped in Table VII below.

TABLE VII

| | |
|---|---|
| r0 = A0, B0, C0, D0, **A4, B4, C4, D4** | r0 = A0, B0, C0, D0, **A4, B4, C4, D4** |
| r2 = A2, B2, C2, D2, A6, B6, C6, D6 | r4 = **E0, F0, G0, H0,** E4, F4, G4, H4 |
| r1 = A1, B1, C1, D1, **A5, B5, C5, D5** | r1 = A1, B1, C1, D1, **A5, B5, C5, D5** |
| r3 = A3, B3, C3, D3, A7, B7, C7, D7 | r5 = **E1, F1, G1, H1,** E5, F5, G5, H5 |
| r4 = **E0, F0, G0, H0,** E4, F4, G4, H4 | r2 = A2, B2, C2, D2, A6, B6, C6, D6 |
| r6 = E2, F2, G2, H2, E6, F6, G6, H6 | r6 = E2, F2, G2, H2, E6, F6, G6, H6 |
| r5 = **E1, F1, G1, H1,** E5, F5, G5, H5 | r3 = A3, B3, C3, D3, A7, B7, C7, D7 |
| r7 = E3, F3, G3, H3, E7, F7, G7, H7 | r7 = E3, F3, G3, H3, E7, F7, G7, H7 |

The result of the final operation is a transposed array, as shown in Table VII below.

TABLE VIII r0 = A0, B0, C0, D0, E0, F0, G0, H0
r4 = A4, B4, C4, D4, E4, F4, G4, H4
r1 = A1, B1, C1, D1, E1, F1, G1, H1
r5 = A5, B5, C5, D5, E5, F5, G5, H5
r2 = A2, B2, C2, D2, E2, F2, G2, H2
r6 = A6, B6, C6, D6, E6, F6, G6, H6
r3 = A3, B3, C3, D3, E3, F3, G3, H3
r7 = A7, B7, C7, D7, E7, F7, G7, H7

Rearranging the order again shows that the original array has been transposed, as shown in FIG. 3C and Table IX below.

TABLE IX r0 = A0, B0, C0, D0, E0, F0, G0, H0
r1 = A1, B1, C1, D1, E1, F1, G1, H1
r2 = A2, B2, C2, D2, E2, F2, G2, H2
r3 = A3, B3, C3, D3, E3, F3, G3, H3
r4 = A4, B4, C4, D4, E4, F4, G4, H4
r5 = A5, B5, C5, D5, E5, F5, G5, H5
r6 = A6, B6, C6, D6, E6, F6, G6, H6
r7 = A7, B7, C7, D7, E7, F7, G7, H7

As may be seen from the foregoing, the transposition of the data in the registers has been completed in twelve swap instructions. Those skilled in the art will be able to readily envisage sequences of swap XOR operations for arrays of sizes other than 8×8.

Figure 4:
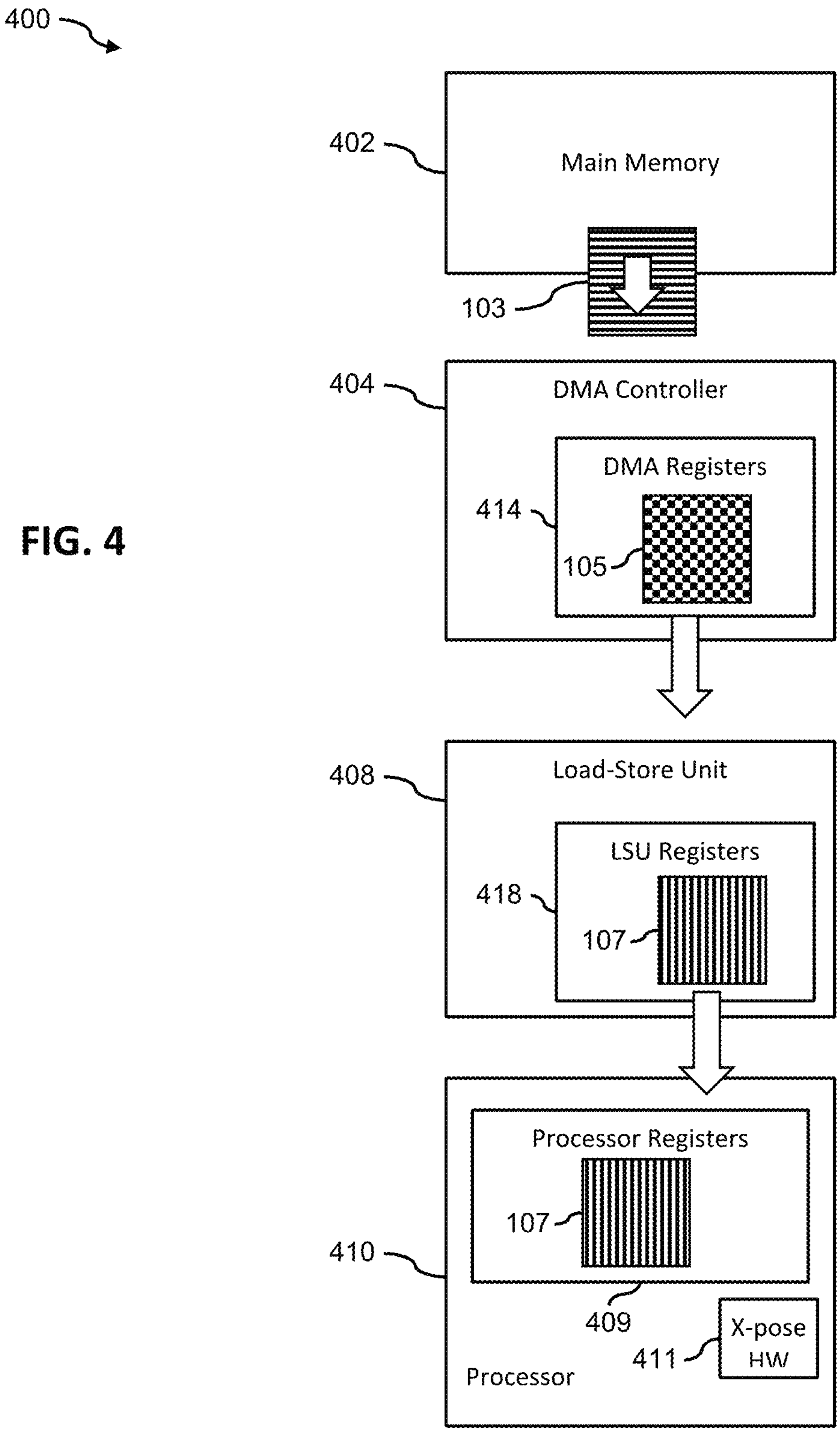
FIG. 4 is a schematic diagram depicting operation of an alternative computer system having enhanced memory access according to aspects of the present disclosure.

FIG. 4 illustrates an alternative computer system 400 according to aspects of the present disclosure that may implement swap operations to transpose an input data array 103 as discussed above with respect to FIGS. 3A-3C. The system includes a main memory 402, DMA controller 404, LSU 406 and processor 410. The DMA controller may include local memory in the form of DMA registers 414 into which the input array 103 is stored. The DMA controller may include hardware configured to implement one or more swap XOR operations on two or more of the DMA registers to shuffle the input array 103 to form the shuffled array 105, e.g., as discussed above with respect to FIG. 3A or perhaps FIG. 3A and FIG. 3B. The DMA controller may then transfer the shuffled array 105 to the LSU 408 where it is stored in LSU registers 418. The LSU may include hardware configured to implement one or more swap XOR operations on the data in two or more of the LSU registers to produce the transposed array 107, e.g., as discussed above with respect to FIG. 3C or perhaps FIG. 3B and FIG. 3C, depending on the swap XOR operations performed by the DMA controller 404. The LSU 408 loads the transposed array to processor registers 409 in the processor 410.

In some implementations, the processor 410 may include transpose hardware 411 configured to implement one or more swap XOR operations that form part or all of a sequence like that shown in FIGS. 3A-3C. Aspects of the present disclosure therefore include implementations in which the aforementioned sequence of swap XOR operations is performed entirely by the DMA controller 404, entirely by the LSU 408, or entirely by the processor 410. Other combinations are also possible, e.g., some swap XOR operations are performed by the DMA controller and LSU but not the processor, some combinations are performed by the LSU and the processor but not the DMA controller, or some combinations are performed by the DMA controller and the processor but not the LSU.

Figure 5:
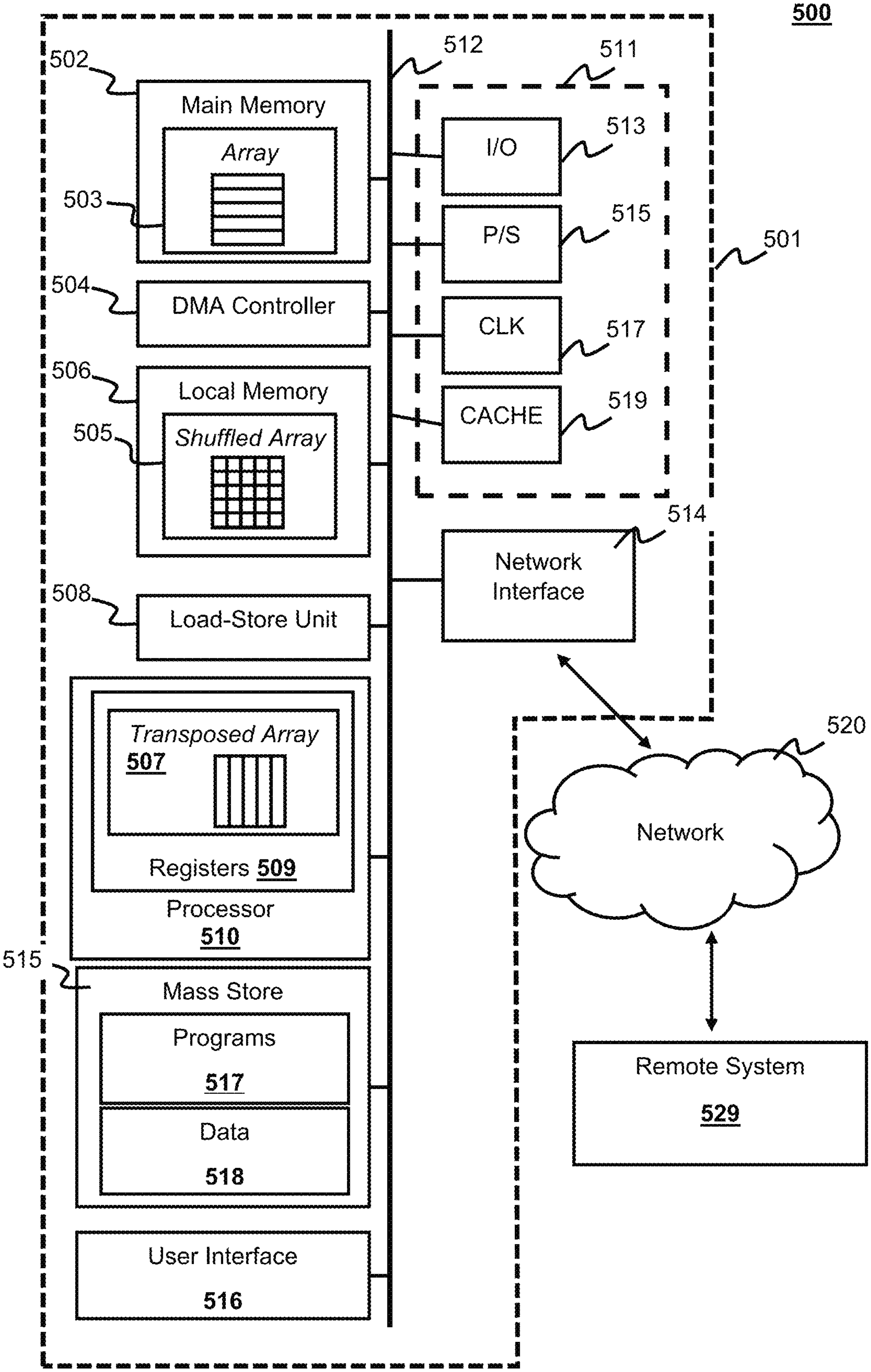
FIG. 5 is a system diagram showing a system implementing the method for enhanced memory access according to aspects of the present disclosure.

FIG. 5 is a system diagram showing a computing system configured implement enhanced memory access according to aspects of the present disclosure. The computing device 500 may have a main memory 502, a direct memory access (DMA) controller 504, a local memory 506, a load-store unit (LSU) 508 and a processor 510. The memory 502, DMA controller 504, local memory 506, LSU 508, and processor 510 may be operatively coupled to each other via a data bus 512. The computing device 500 may optionally include a mass storage device 515 such as a disk drive, CD-ROM drive, tape drive, flash memory, solid state drive (SSD) or the like, and the mass storage device may store programs and/or data.

The computing device 501 may also include well-known support circuits 511, such as input/output (I/O) 513, circuits, power supplies (P/S) 515, a clock (CLK) 517, and one or more caches 519. The support circuits may communicate with other components of the system, e.g., via the data bus 512.

The computing device may include a network interface 514 to facilitate communication with other devices. The processor 510 and network interface 514 may be configured to implement a local area network (LAN), personal area network (PAN), Wide area network (WAN), and/or communicate with the internet, via a suitable network protocol, e.g., Bluetooth, for a PAN. The network interface 514 facilitates communication via an electronic communications network 520. The network interface 514 may be configured to facilitate wired or wireless communication over LAN, PAN, and/or the internet with a remote system 529. The server may be a social networking server and/or a feature information server. The computing system 500 may send and receive data and/or commands via one or more message packets over the network 520. Message packets sent over the network 520 may temporarily be stored in a buffer in memory 502.

The computing device 501 may also include a user interface 516 to facilitate interaction between the system and a user. The user interface may include a display screen, a keyboard, a mouse, microphone, a light source and light sensor or camera, a touch interface, game controller, or other input device.

The main memory 502 may include one or more memory units (e.g., random access memory (RAM), static random-access memory (SRAM), dynamic random-access memory (DRAM), read-only memory (ROM), and the like). Data may be stored in the main memory 502 in the form of one or more arrays 503. Each array entry may correspond to one or more bytes data, e.g., 1 byte (8 bits), 1 word (2 bytes (16 bits)), 1 double word (4 bytes (32 bits)), or 1 quad word (8 bytes (64 bits)).

The DMA controller 504 may include processing capability in addition to normal memory access capabilities. According to aspects of the present disclosure, such processing capabilities may include the ability to shuffle the data in the array 503, e.g., by implementing XOR operations as discussed above with respect to FIG. 2 or swap operations as discussed above with respect to FIGS. 3A-3C. The DMA controller 504 may then store resulting shuffled array 505 may then be stored in the local memory 506. The local memory may similarly include RAM, SRAM, DRAM, or other similar memory units, which may be of smaller memory capacity and/or faster access than the main memory 502. In some implementations, the local memory may be a component of the DMA controller 504.

The LSU 508 may include processing capability in addition to data loading and storage capabilities. According to aspects of the present disclosure, such processing capabilities may include the ability to perform operations on the data in the shuffled array 505 to produce a transposed array 507 in which the rows and columns of the input array 503 have been transposed. To accomplish this, the LSU 508 may perform, e.g., XOR operations as discussed above with respect to FIG. 2 or swap operations as discussed above with respect to FIGS. 3A-3C. The LSU 508 may load the transposed array into data registers 509 of the processor 510.

The processor 510 may include a central processing unit (CPU) having one or more processing cores configured according to well-known architectures, such as, e.g., single-core, dual-core, quad-core, multi-core, processor-coprocessor, cell processor, and the like. The processor 510 may alternatively include a graphical processing unit (GPU), which may include multiple compute units configured according to known architectures. The processor 510 may perform operations on the data in the registers 509, e.g., by executing instructions of one or more programs 517, portions of which may be stored in memory 502. The instructions may be loaded into instruction registers (not shown) of the processor 510. The programs may be part of the platform's operating system or part of an application or may be standalone programs or services running independently of the application.

In some implementations, one or more of the DMA controller 504, LSU 508 and processor 510 may be include registers of sufficient capacity to store an array the size of the input array 503 and may be further configured to perform one or more register swap operations that transpose the input data array 503, e.g., as discussed above with respect to FIG. 3A to FIG. 3C. By way of example, and not by way of limitation, the DMA controller may perform a "swap XOR1" operation of the type illustrated in FIG. 3A, the LSU 508 may perform a "swap XOR2" operation of the type illustrated in FIG. 3B and the processor 510 may perform a "swap XOR3" operation of the type illustrated in FIG. 3C. Alternatively, the DMA controller 504 may perform the swap XOR1 and swap XOR2 operations and the LSU 508 or processor 510 may perform the swap XOR3 operation. Furthermore, the DMA controller 504 may perform the swap XOR1 operation and the LSU 508 or processor 510 may perform the swap XOR2 and swap XOR3 operations. Alternatively, the LSU 508 may perform the swap XOR1 operation and the processor may perform the swap XOR2 and swap XOR3 operations. Furthermore, any one of the DMA controller, LSU, or processor may be configured to perform swap XOR1, swap XOR2, and swap XOR3 operations.

According to aspects of the present disclosure memory access may be greatly sped up by implementing data transposition in hardware with specialized instructions. This reduces the number of processor cycles required to transpose the data.

While the above is a complete description of the preferred embodiment of the present invention, it is possible to use various alternatives, modifications, and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "A," or "An" refers to a quantity of one or more of the item following the article, except where expressly stated otherwise. The appended claims are not to be interpreted as including means-plus-function limitations, unless such a limitation is explicitly recited in a given claim using the phrase "means for."

The invention claimed is:

1. A computer system comprising:
a processor having a plurality of registers;
a main memory;
a local memory;
a direct memory access (DMA) controller configured to perform one or more operations on an array of data from the memory to generate a shuffled array of data from the array of data from the memory and store the shuffled array in the local memory; and
a load-store unit configured to perform one or more operations on the shuffled array of data stored in the local memory to produce a transposed array of data in which rows and columns of the array of data are transposed, and wherein the load-store unit is configured to load the transposed array of data into the plurality of registers.

2. The system of claim 1, wherein the DMA controller is configured to perform the one or more operations on the array of data from the memory by performing an incrementing XOR operation in each row of data in the array of data to shuffle lanes of data in each said row of data to generate the shuffled array of data.

3. The system of claim 2, wherein the load-store unit is configured to perform the one or more operations on the shuffled array of data by loading each lane in each row of the shuffled array of data from corresponding incremented memory indices of a local memory according to an incrementing XOR pattern to produce the transposed array of data.

4. The system of claim 1, wherein the DMA controller is configured to perform the one or more operations on the array of data from the memory by performing one or more swap operations between one or more pairs of data entries in two or more rows of data in the array of data to shuffle lanes of data in each said row of data to generate the shuffled array of data.

5. The system of claim 4, wherein the load-store unit is configured to perform the one or more operations on the shuffled array of data by performing one or more swap operations between one or more pairs of data entries in two or more rows of data in the shuffled array of data to produce the transposed array of data.

6. A method for transferring transposed data from a memory to a plurality of registers, comprising: performing one or more operations on an array of data from a memory to generate a shuffled array of data with a direct memory access controller; and performing one or more operations on the shuffled array of data with a load-store unit to produce a transposed array of data in which rows and columns of the array of data are transposed; and loading the array of transposed data into a plurality of registers of a processor with the load-store unit.

7. The method of claim 6, wherein performing the one or more operations on the array of data from the memory includes performing an incrementing XOR operation in each row of data in the array of data to shuffle lanes of data in each said row of data to generate the shuffled array of data.

8. The method of claim 7, wherein performing the one or more operations on the shuffled array of data includes loading each lane in each row of the shuffled array of data from corresponding incremented memory indices of a local memory along with an incrementing XOR pattern to produce the transposed array of data.

9. The method of claim 6, wherein performing the one or more operations on the array of data from the memory includes performing one or more swap operations between one or more pairs of data entries in two or more rows of data in the array of data to shuffle lanes of data in each said row of data to generate the shuffled array of data.

10. The method of claim 9, wherein performing the one or more operations on the shuffled array of data includes performing one or more swap operations between one or more pairs of data entries in two or more rows of data in the shuffled array of data to produce the transposed array of data.

11. A computer system comprising:

a main memory;

a direct memory access (DMA) controller;

a load-store unit (LSU), and;

a processor having a plurality of registers;

wherein the DMA controller, LSU, and processor include hardware configured to perform one or more operations on an array of data from the memory to generate a shuffled array of data from the array of data from the memory and to perform one or more operations on the shuffled array of data to produce a transposed array of data in which rows and columns of the array of data are transposed, and wherein the load-store unit is configured to load the transposed array of data into the processor's plurality of registers.

12. The system of claim 11, wherein the DMA controller is configured to perform the one or more operations on the array of data from the memory by performing an incrementing XOR operation in each row of data in the array of data to shuffle lanes of data in each said row of data to generate the shuffled array of data.

13. The system of claim 12, wherein the load-store unit is configured to perform the one or more operations on the shuffled array of data by loading each lane in each row of the shuffled array of data from corresponding incremented memory indices according to an incrementing XOR pattern to produce the transposed array of data.

14. The system of claim 11, wherein the DMA controller or the LSU is configured to perform the one or more operations on the array of data from the memory by performing one or more swap operations between one or more pairs of data entries in two or more rows of data in the array of data to shuffle lanes of data in each said row of data to generate the shuffled array of data.

15. The system of claim 14, wherein the DMA controller or the LSU is configured to perform the one or more operations on the shuffled array of data by performing one or more swap operations between one or more pairs of data entries in two or more rows of data in the shuffled array of data to produce the transposed array of data.

16. The system of claim 11, wherein the DMA controller is configured to perform the one or more operations on the array of data from the memory by performing one or more swap operations between one or more pairs of data entries in two or more rows of data in the array of data to shuffle lanes of data in each said row of data to generate the shuffled array of data and wherein the DMA controller configured to perform the one or more operations on the shuffled array of data by performing one or more swap operations between one or more pairs of data entries in two or more rows of data in the shuffled array of data to produce the transposed array of data.

17. The system of claim 11, wherein the LSU is configured to perform the one or more operations on the array of data from the memory by performing one or more swap operations between one or more pairs of data entries in two or more rows of data in the array of data to shuffle lanes of data in each said row of data to generate the shuffled array of data and wherein the LSU configured to perform the one or more operations on the shuffled array of data by performing one or more swap operations between one or more pairs of data entries in two or more rows of data in the shuffled array of data to produce the transposed array of data.

* * * * *